United States Patent

[11] 3,617,848

[72] Inventors Robert E. Friday;
Clyde M. Kobe; James W. Locker, all of,
Minneapolis, Minn.
[21] Appl. No. 758,752
[22] Filed Sept. 10, 1968
[45] Patented Nov. 2, 1971
[73] Assignee Honeywell Inc.
Minneapolis, Minn.

[54] SYNCHRONIZATION AND ATTITUDE COMMAND NULLING APPARATUS
3 Claims, 1 Drawing Fig.

[52] U.S. Cl. .................................................. 318/584,
318/591, 244/77
[51] Int. Cl. ...................................................... G05b 7/00,
B64c 13/18
[50] Field of Search .......................................... 318/20.211,
20.245

[56] References Cited
UNITED STATES PATENTS
2,751,543  6/1956  Alderson ..................... 318/20.211 X
2,975,351  3/1961  Wegley ......................... 318/20.245
3,240,446  3/1966  Miller ........................... 318/20.211 X Primary Examiner—T. E. Lynch
Attorneys—Charles J. Ungemach, Ronald T. Reiling and Bruce C. Lutz ABSTRACT: A pitch axis flight control having a single motor to provide preengagement synchronization of the pitch axis manual controller and automatic nulling of the control after a control mode change from an attitude hold mode to an altitude hold mode. Preengagement synchronization is provided by electrically summing outputs of a vertical gyro and the manual controller, and using the summed signal to control an amplifier and motor combination, which drives the manual controller to a position such that the vertical gyro output signal is nullified by the manual controller output. Upon switching of the system from an attitude hold mode to an altitude hold mode, a switching relay actuates an altitude error device whose signal is combined with the vertical gyro signal and the pitch controller signal to derive a control error signal. To insure levelling off of the craft in altitude hold, a switching relay disconnects the vertical gyro signal from the amplifier and motor combination, thereby causing the pitch control potentiometer to be driven to a null output. Apparatus for automatically switching the flight control from an altitude to an attitude hold mode upon repositioning the pitch control potentiometer is also disclosed.

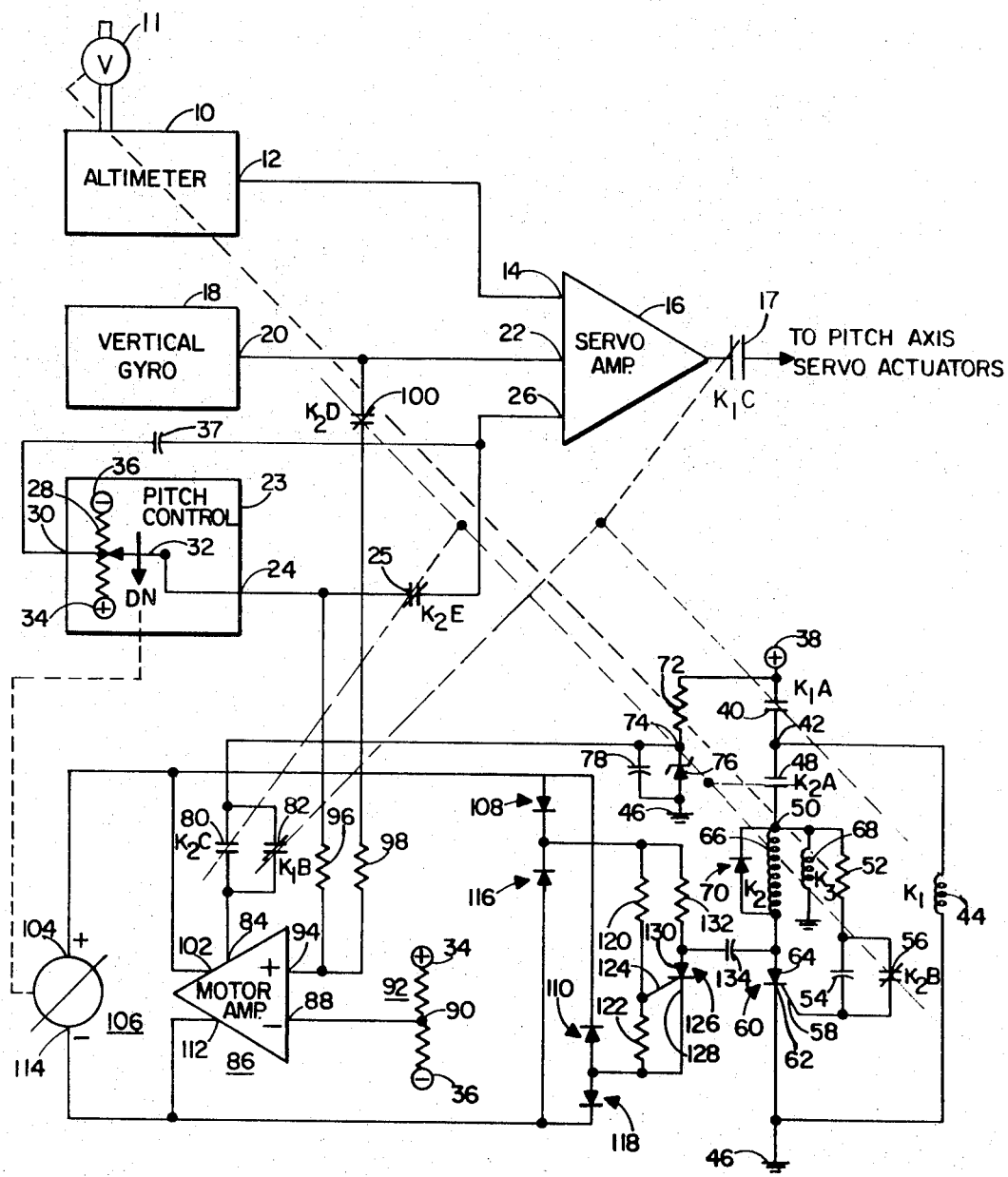

SYNCHRONIZATION AND ATTITUDE COMMAND NULLING APPARATUS

BACKGROUND OF THE INVENTION

1. Field of the Invention

The present invention pertains generally to the field of electronic systems and more particularly to the field of automatic control of aircraft.

2. Description of the Prior Art

Automatic controls for aircraft which provide the control of aircraft attitude or altitude are known in the prior art. The prior art controls develop control signals for the control surfaces from a combination of signals derived from an attitude error transducer, an altitude error transducer, and a manual controller.

When an automatic aircraft control is operated in an attitude hold mode, only the attitude error transducer and the manual controller normally provide signals to the control surfaces. To eliminate the transients that would occur when an automatic control is energized in an attitude hold mode with a large control signal present, a synchronizer is required to modify the output of the manual controller so that the sum of the attitude error signal and the manual controller output signal is nulled. In order to perform this synchronization function, prior art automatic aircraft controls required a fairly complex synchronization system.

When conventional aircraft automatic controls are switched from a pitch attitude hold mode to an altitude hold mode, the pitch attitude command must be nulled to eliminate the steady state altitude error which occurs when the pitch manual controller signal is combined with the altitude error signal to actuate the aircraft's control surfaces. The nulling of the pitch manual control output in an attitude hold mode has been accomplished in the prior art by the use of complex control centering arrangements.

Prior art systems employing attitude synchronization and attitude command nulling functions required a complexity of mechanization that substantially increased the cost and weight of the automatic control system and tended to decrease the reliability of the system because of the complexity. The present invention provides a single means for performing both the attitude synchronization and command nulling functions for attitude commands during the altitude hold mode and results in a simple, highly reliable, automatic control.

SUMMARY OF THE INVENTION

The present invention provides an aircraft automatic control utilizing a single electromechanical means for providing an attitude synchronization function and also providing for the nulling of the pitch attitude command after an altitude hold mode has been selected.

When the flight control is initially enabled in an attitude hold mode, the control surface actuators are driven by a signal derived from a combination of a vertical gyro or pitch attitude error signal and a pitch attitude command signal obtained from a control potentiometer in the pitch manual controller. In order to synchronize the output of the pitch controller and the output of the vertical gyro before the aircraft control system is enabled, the vertical gyro signal and the output of the pitch controller are electrically summed and the resultant control error signal is connected to an amplifier and motor combination which acts to drive the pitch control potentiometer to a position causing the control error signal to be driven to a null condition. Thus, when the pitch axis of the flight control is enabled for positioning the control surfaces, the initial signal derived from the vertical gyro and the pitch control potentiometer will be a null signal and no initial transient actuation of the control surfaces will result. After the pitch attitude hold mode has been enabled, the aircraft control surfaces are actuated in response to a control signal derived from the vertical gyro and the pitch attitude control and the amplifier and motor combination is disabled. Thus, the aircraft continues to hold the attitude established when the flight control was enabled. Changes in aircraft attitude may then be commanded by manually repositioning the wiper of the pitch control potentiometer.

When the control system is switched to an altitude hold mode from an attitude hold mode, an attitude error signal is combined with the vertical gyro signal and the pitch controller signal to derive a control error signal. In order to assure that the aircraft levels off at the particular altitude at which the altitude hold mode was engaged, the pitch control potentiometer is rapidly driven to null at the time the altitude hold mode is engaged. This operation is accomplished by connecting the output signal of the pitch control potentiometer to the input of the synchronizing amplifier an motor combination thereby causing the pitch control potentiometer to be driven until a null output is obtained from the potentiometer. The system may be switched from altitude hold mode back to an attitude hold mode by manually deflecting the pitch control potentiometer to automatically return the control system to an attitude hold mode.

It is therefore an object of the present invention to provide an improved aircraft automatic flight control system wherein a single means is provide for performing an attitude synchronization function and an attitude command nulling function.

It is a further object of the present invention to provide a circuit for switching an automatic flight control from an altitude hold mode to an attitude hold mode upon movement of the pitch control potentiometer.

These and further objects will become apparent to those skilled in the art upon examination of the following specification, claims, and the drawing.

BRIEF DESCRIPTION OF THE DRAWING

The sole FIGURE is a modified schematic diagram of the invention wherein certain well-known elements are represented in block diagram form.

DETAILED DESCRIPTION

Referring to the drawing, an altimeter 10 has an output enabling means 11, which may be a solenoid valve; and an output terminal 12 connected to an input terminal 14 of a servo amplifier 16. The altimeter 10 may be any one of a number of well-known altitude error measuring devices. The output of servoamplifier 16 is connected to the pitch axis servo actuators (not shown) through a pair of normally open contacts $K_1C17$. For example, the altimeter might be of the captive air type described in the patent to R.W. Armstrong et al. U.S. Pat. No. 3,085,595, assigned to the assignee of the present invention.

A vertical gyro 18 has an output terminal 20 connected to an input terminal 22 of servoamplifier 16. A pitch manual controller or attitude command potentiometer unit 23 has an output terminal 24 connected through a pair of normally closed relay $1K_2E$ 25 to an input terminal 26 of servoamplifier 16. The pitch controller 23 comprises a potentiometer or resistor 28 having a center tap terminal 30 and an adjustable wiper 32. The resistor 28 is connected between a source of positive potential 34 and a source of negative potential 36. A capacitor 37 is connected between center tap terminal 30 and input terminal 26.

A source of positive potential 38 is connected through a pair of normally open relay contacts $K_1A$ 40, a junction point 42 and a relay winding $K_1$ 44 of an AUTOPILOT solenoid held switch to a source of reference potential or ground 46. The solenoid held switch is a push-on, remain-in, pushoff pushbutton switch. The switch is a momentary contact switch until the solenoid winding 44 is energized causing the switch to be alternate acting. The particular switch used was manufactured by Pendar, Inc., Post Office Box 1014, Coeur D'Alene, Idaho.

Junction point 42 is also connected through a pair of normally open relay contacts $K_2A$ 48 to a junction point 50 which is connected through a resistor 52 then through a parallel combination of a capacitor 54 and a pair of normally closed relay contacts $K_2B$ 56 to a gate terminal 58 of a silicon control rectifier, hereinafter referred to as SCR, 60. A cathod 62 of SCR 60 is connected to ground 46. Junction point 50 is connected to an anode 64 of SCR 60 through a parallel combination of a solenoid winding $K_2$ 66 of an ALT HOLD solenoid held switch and a diode 70 which is connected with the direction of easy current flow poled from SCR anode 64 to junction point 50. A solenoid winding $K_3$ 68 is connected between junction point 50 and ground. The solenoid winding $K_3$ 68 is connected to a normally open solenoid valve which, when closed, enables altimeter 10 to produce output signals indicative of the change of pressure experienced after the solenoid valve is closed.

The source of positive potential 38 is also connected through a resistor 72 to a junction point 74 which is connected through a parallel combination of a zener diode 76 and a capacitor 78 to ground 46. Zener diode 76 is oriented with an anode connected to ground 46. Junction point 74 is also connected through a parallel combination of a pair of normally open relay contacts $K_2C$ 80 and a pair of normally closed relay contacts $K_1B$ 82 to a power input terminal 84 of a motor amplifier 86.

The motor amplifier 86 has an inverting input 88 connected to a tap terminal 90 of a resistor 92 which is connected at one end to the positive voltage source 34 and at the other end to negative voltage source 36. A noninverting input 94 of amplifier 86 is connected through a resistor 96 to the output terminal 24 of pitch controller 23. Terminal 94 is also connected through a resistor 98 and a pair of normally closed relay contacts $K_2D$ 100 to the output terminal 20 of vertical gyro 18. An output terminal 102 of the motor amplifier 86 is connected to a terminal 104 of a DC motor 106 and also to an anode of a diode 108 and a cathode of a diode 110. Another output terminal 112 of motor amplifier 86 is connected to a terminal 114 of motor 106 and also to an anode of a diode 116 and a cathode of diode 118. The cathodes of diodes 108 and 116 are connected together and through a series combination of resistors 120 and 122 to commonly connected anodes of diodes 110 and 118. The junction point of resistors 120 and 122 is connected to a gate 124 of an SCR 126 which has its cathode 128 connected to the anodes of diodes 110 and 118. An anode 130 of SCR 126 is connected through a resistor 132 to the cathodes of diodes 108 and 116 and is also connected through a capacitor 134 to the anode 64 of SCR 60.

The output shaft of motor 106 is mechanically linked to wiper 32 of pitch controller 23.

Operation

SYNCHRONIZATION

When the autopilot is in a disengaged mode, neither of the solenoids $K_1$ 44 or $K_2$ 66 are engaged and DC power is supplied to terminal 84 of motor amplifier 86 through a series path from power source 38 through resistor 72 and the normally closed contact 82. In the disengaged mode, the pitch axis servo actuators (not shown) are not connected to receive the output of the servo amplifier although the servoamplifier does receive input signals from the vertical gyro 18 and the pitch controller 23.

The vertical gyro 18 develops an electrical signal at terminal 20, which is representative of the deviation of the aircraft about its pitch axis from a predetermined attitude. This attitude error signal, which is indicative of the rate of change of aircraft altitude, is conducted into the noninverting input 94 of the motor amplifier 86 through the series path formed by normally closed relay contacts $K_2D$ 100 and resistor 98. The output of the pitch controller 23 is connected to the noninverting input 94 through resistor 96.

The signal from the vertical gyro 18 and the signal from the pitch controller 22, are summed at the input 94 of the motor amplifier 86. If the resultant error signal at the input 94 is positive, a positive voltage will be applied to terminal 104 of motor 106 by the output terminal 102 of the motor amplifier 86. The positive voltage at terminal 104 will cause a current to flow through the motor 106 to ground. The positive voltage applied to terminal 104 causes the motor to rotate in a direction such that the linkage between the motor and the wiper of the pitch control potentiometer 28 causes the wiper to be moved whereby an increasingly negative signal is developed at output terminal 24 to null out the positive signal being applied to the motor amplifier input terminal 94. Thus, the setting of the pitch control potentiometer 28 is adjusted to cancel out the signal from the vertical gyro output 20. If the polarity of the resultant error signal appearing at terminal 94 is negative, a positive voltage will be produced at motor amplifier output terminal 112 and drive a positive current into terminal 114 of motor 106. Positive current supplied to terminal 114 causes the motor to rotate in the opposite direction to move the pitch control potentiometer 28 and develop an increasingly positive output signal at output terminal 24.

When it is desired to enable the flight control system, the AUTOPILOT solenoid held switch is depressed, actuating solenoid winding $K_1$ 44 and its associated pairs of contacts $K_1A$ 40 and $K_1B$ 82. At the time that the winding $K_1$ is actuated, the pitch axis servo actuators are also enabled so that control signals appearing at the output terminal of servoamplifier 16 are connected to the servo actuators causing them to position the pitch axis control surfaces in response to the servoamplifier input signals. Prior to the actuation of solenoid $K_1$, the motor amplifier 86 and the motor 106 nulled the output of the pitch potentiometer 28 against the attitude error output signal developed at vertical gyro output 20. The opening of solenoid contacts 82, when the AUTOPILOT switch is actuated removes power from the motor amplifier 86 and the synchronization of the pitch controller 23 to the output of the vertical gyro 18 ceases. After solenoid $K_1$ is actuated, the control of the craft may be accomplished by selecting a desired control attitude by manually positioning controller 23 to a selected command attitude and allowing servoamplifier 16 to command the servo actuators to position the pitch control surfaces to cause the craft to assume a new attitude which, when sensed by the vertical gyro 18, will produce an attitude error signal at the servoamplifier input terminal 22 that will sum with the command input signal at servoamplifier input terminal 26 to cause a null output of the servoamplifier 16.

In the attitude hold mode selected by energizing solenoid $K_1$ 44, the altimeter 10 does not produce an error signal at terminal 12 because the winding $K_3$ 68 of the solenoid connecting the altimeter bellows to the ambient air is unactuated, leaving the open condition so that there is no difference in pressure between the air within the altimeter bellows and the outside air.

ATTITUDE NULLING

When a desired altitude has been reached, and the aircraft is still in the attitude hold mode, the altitude hold mode is enabled by depressing the ALT HOLD solenoid held switch, actuating solenoid winding $K_2$ 66 and the $K_2$ contacts 25, 48, 56, 80, and 100. The closing of the normally open contacts 48 applies a positive current through resistor 52 and capacitor 54 to the gate terminal of SCR 60. A fairly large initial current will flow through capacitor 54 because the normally closed contacts 56, shunting the capacitor, have assured that the initial voltage across capacitor 54 will be quite small. The gate current thus applied to gate 58 turns SCR 60 on, allowing a sustaining current to flow through solenoid winding 68 which closes the solenoid valve which connects the bellows of the altimeter 10 to the ambient atmosphere.

When the solenoid valve in the altimeter 10 is closed, an altitude error signal will be generated at altimeter terminal 12 when the aircraft departs sufficiently from the altitude at which the valve was closed to create a pressure differential between the air enclosed within the altimeter bellows and the ambient air. The altitude error signal from the altimeter 10 is summed with the error signal from the vertical gyro 18 and the control signal from the manual pitch controller 23 at the input of the servoamplifier 16. At the time that the altitude hold mode was selected by actuating solenoid $K_2$ 66 the servoamplifier output signal developed by the sum of the attitude error signal from the vertical gyro 18 and the pitch manual controller output signal from the pitch controller 23 was quite small because the operation of the pitch actuators on the control surfaces tended to move the aircraft so as to constantly reduce the magnitude of the control error signal.

When the altimeter is initially enabled by actuation of the ALT HOLD solenoid $K_3$ 68, the control error signal generated by servoamplifier 16 will not significantly change until a substantial altitude error signal is generated by the altimeter 12. Thus, there is no transient servoamplifier signal developed upon the transition from an attitude hold mode to an altitude hold control mode. If the pitch control 23 and the vertical gyro 18 are both allowed to continue to apply their signals to the input of the servo amplifier 16, the steady state altitude at which the aircraft will level off will not correspond to the altitude at which the altitude hold mode was selected because a substantial altitude error signal from the altimeter 10 will be required to balance the error signal produced by the pitch manual controller and allow the craft to assume a pitch attitude for level flight. To eliminate this steady state altitude error, the present system provides circuitry for nulling the output of pitch controller 28 when the altitude hold mode is selected. When the pitch control potentiometer 28 has a zero level output signal, the magnitude of the altitude error signal that must be developed by the altimeter 10 to balance the output of the vertical gyro 18 is quite small so that no steady state altitude error results. The output signal of the vertical gyro 18 remains connected to the servoamplifier input in the altitude mode to assure that transient pitch attitude errors introduced by turbulence are rapidly cancelled before an altitude error is developed. The attitude error signal here has the function of an altitude rate of change signal.

The same basic circuitry that was used to synchronize the output of the pitch controller 23 to the attitude error output of the vertical gyro 18 upon engagement of the flight control is also used to null the output of the pitch controller 23 when the altitude hold mode is enabled. Upon enabling of the altitude hold mode, the normally open relay contacts $K_2C$ 80 are closed, supplying power to terminal 84 of the motor amplifier 86. The vertical gyro attitude error signal is disconnected from the input 94 of the motor amplifier 86 when the normally closed relay contacts $K_2D$ 100 are open. Thus, in the altitude hold mode, the only error signal applied to input terminal 94 of motor amplifier 86 is the signal developed by the pitch controller 23. The combination of the motor amplifier 86 and the motor 106 acts to null the input signal at terminal 94 of the motor amplifier in a manner similar to that previously described for the attitude synchronization function and the signal at output 24 of pitch controller 23 thereby nulled. Because the combination of the motor amplifier 86 and the motor 106 acts to drive the pitch potentiometer wiper 32 to a null position quite rapidly, the servoamplifier would tend to develop a large transient command signal at its output due to the momentary signal imbalance at its input caused by the rapid removal of the pitch manual control signal while there is still a vertical gyro error signal present. To reduce the effect of this transient, switch contact $K_2E$ 25 is opened as the altitude hold mode is engaged, disconnecting the output of the pitch controller from the input of the servoamplifier 26. A signal corresponding to the output of the pitch controller at the time the altitude hold mode was engaged is applied to the servoamplifier terminal 26 by capacitor 37. Capacitor 37 was charged to a signal corresponding to the signal at output 24 of the pitch controller 23 when the normally closed contacts 25 were closed. When the contacts 25 are opened as the altitude hold mode is engaged, the capacitor 37 initially applies to the input of the servoamplifier the signal that was present at the output of the pitch control.

The capacitor 37 allows the signal to slowly decrease to a low level as the charge decays. Thus, when the altitude hold mode is engaged, a signal corresponding to the steady state output of the pitch controller is slowly removed from the input of the servo amplifier as the pitch controller is mechanically nulled.

When it is desired to switch the flight control from the altitude hold mode back to an attitude hold mode, the pitch controller 23 may be manually positioned to command a new desired pitch attitude. The movement of the pitch control imbalances the input signal at terminal 94 of the motor amplifier and causes the motor amplifier to develop an output voltage between output terminals 112 and 102. This output voltage is rectified by diodes 108, 110, 116, and 118, such that a positive current flows through resistor 120 and resistor 122 independent of the relative polarity between the motor amplifier output terminals 102 and 112. If a sufficiently large error signal is developed between terminals 102 and 112, SCR 126 will be turned ON by the voltage developed across resistor 122 and the current flowing through solenoid windings $K_2$ 66 and $K_3$ 68 will be shunted through capacitor 134 by the turned ON SCR 126. Shunting of the current through capacitor 134 decreases the current passing through SCR 60 to a level below the hold ON threshold and since capacitor 54 blocks DC and prevents a steady state gate current from being applied to gate 58 of SCR 60, SCR 60 will turn off. After SCR 60 has been turned off, the current through solenoid windings $K_2$ 66 and $K_3$ 68 is removed causing the solenoids to deactuate, and forcing the system to revert to the attitude hold mode.

The system may also be caused to revert to the attitude hold mode by depressing the ALT HOLD solenoid held switch while the craft is in an altitude hold mode. Contacts $K_2A$ 48, $K_2B$ 56, $K_2C$ 80 and $K_2D$ 100 and $H_2E$ 25 will be returned to their unenergized condition, the output error signal of the altimeter 10 is disabled, and the output of the centered pitch controller 23 is connected to the servoamplifier 10 so that new attitude command signals may be applied.

There are a number of alternate configurations which are within the scope of the present invention. For example, altimeters other than the captive air type may be substituted for altimeter 10, the only requirement being that an altimeter error signal be developed at the output 12 of the altimeter 10 and that means be provided for disconnecting the altitude error signal from the servoamplifier input 14 when attitude hold modes are selected.

Other alterations and variations will be obvious to those skilled in the art. We do not wish to be limited to the specification for the preferred embodiment shown in the FIGURE but only by the following claims.

We claim:

1. In combination with a dirigible craft automatic control system of the type wherein an attitude hold servo actuator control signal is derived from an attitude error output signal of a vertical gyro and an attitude command output signal from a manual controller and also wherein an altitude hold servo actuator control signal is derived from an altitude error output signal of an altimeter, the improvement which comprises:

electromechanical means, including input means and output means connected to said manual controller to vary the output therefrom in accordance with the algebraic sum of the signals applied to the input means;

connecting means for conducting the command output signal of said manual controller to the input means of said electromechanical means;

first switchable means connected between said vertical gyro and said electromechanical means, said first switchable means operable in a first condition to conduct the attitude error output signal of said vertical gyro to the input means of said electromechanical means and operable in a second condition to disconnect the attitude error output signal of said vertical gyro from the input means of said electromechanical means;

second switchable means operative in a first condition to conduct said servo actuator control signal to said servo actuators, and operative in a second condition to disconnect the servo actuator control signal from said servo actuators;

means for enabling the output of said altimeter; and mode selection means for enabling the automatic control system in an attitude synchronization mode by placing said first switchable means in the first condition while said second switchable means is in the second condition and for enabling the automatic control system in an attitude control mode by switching said first switchable means from the first condition to the second condition and switching said second switchable means to the first condition while simultaneously disabling said electromechanical means, said mode selection means also operative to enable the automatic control system in an altitude hold mode by actuating the means for enabling the output of said altimeter and placing said first switchable means in the second condition.

2. Apparatus of the class described in claim 1 wherein said mode selection means includes means for returning said automatic control system from an altitude hold mode to an attitude hold mode when said manual controller is actuated.

3. An automatic flight control system wherein a control surface servo amplifier receives its input signals from an altimeter, a vertical gyro, and a manual controller, means for synchronizing the position of said manual controller with the output of said vertical gyro before enabling said servo amplifier and also for nulling the output of said controller when an altitude hold mode is engaged, said means comprising in combination:

motor means connected to vary the position of said manual controller in response to an input;

amplifier means connected to the input of said motor means, said amplifier means operable to deliver the drive signal to said motor means in response to an input; and signal selection means connected to the input of said amplifier means and the output of said manual controller and said vertical gyro, said signal selection means operative to conduct a signal to the input of said amplifier means representative of the output signal of said vertical gyro and said manual controller to provide an attitude synchronization function before said servo amplifier is enabled, said signal selection means operative to conduct the output signal of said controller to the input means of said amplifier means, when an altitude hold mode is selected.

* * * * *